(12) United States Patent
Nakano et al.

(10) Patent No.: US 7,360,415 B2
(45) Date of Patent: Apr. 22, 2008

(54) THERMAL TYPE AIR FLOW METER HAVING SEMICONDUCTOR SENSOR ELEMENTS WITH SIMILAR DIAPHRAGM SIZES

(75) Inventors: Hiroshi Nakano, Tokyo (JP); Izumi Watanabe, Ibaraki (JP); Masamichi Yamada, Tokyo (JP); Masahiro Matsumoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/202,017

(22) Filed: Aug. 12, 2005

(65) Prior Publication Data

US 2006/0037390 A1    Feb. 23, 2006

(30) Foreign Application Priority Data

Aug. 18, 2004    (JP)    ............... 2004-238565

(51) Int. Cl.
*G01F 1/68*    (2006.01)
(52) U.S. Cl. .................................................. 73/204.26
(58) Field of Classification Search .............. 73/204.26
See application file for complete search history.

(56) References Cited

U.S. PATENT DOCUMENTS

| | | | |
|---|---|---|---|
| 4,565,096 A * | 1/1986 | Knecht ........................ | 73/718 |
| 5,452,610 A | 9/1995 | Kleinhans et al. | |
| 5,569,856 A * | 10/1996 | Jacobs-Cook ................ | 73/702 |
| 5,813,764 A | 9/1998 | Visser et al. | |
| 6,301,960 B1 | 10/2001 | Yamakawa et al. | |
| 6,571,623 B1 | 6/2003 | Blasczyk et al. | |
| 6,644,113 B2 * | 11/2003 | Kawai et al. ............. | 73/204.26 |
| 6,684,693 B2 * | 2/2004 | Tanimoto et al. ........ | 73/204.26 |
| 6,725,716 B1 * | 4/2004 | Kawai et al. ............. | 73/204.26 |
| 6,845,662 B2 * | 1/2005 | Kawai et al. ............. | 73/204.26 |
| 6,971,266 B2 * | 12/2005 | Kawai ...................... | 73/204.26 |
| 2002/0157463 A1 | 10/2002 | Kawai et al. | |

FOREIGN PATENT DOCUMENTS

| | | |
|---|---|---|
| EP | 1108990 | 6/2001 |
| JP | 2001-349759 | 12/2001 |

OTHER PUBLICATIONS

Li Qui et al., "Micro Gas-Flow Sensor with Integrated Heat Sink and Flow Guide", Sensors and Actuators, 1996, pp. 547-551, vol. 54, No. 1-3, Elsevier Science S.A., XP004077922, ISSN: 0924-4247.
European Search Report dated Dec. 6, 2005.

* cited by examiner

*Primary Examiner*—Harshad Patel
(74) *Attorney, Agent, or Firm*—Crowell & Moring LLP.

(57) ABSTRACT

A thermal type air flow meter that makes it possible to precisely and easily determine whether a sensor element is a non-defective or a defective by screening is provided. First and second diaphragm sections composed of an electrical insulating film are formed in a semiconductor substrate. A heating resistor and a resistor for intake air temperature sensor are disposed on them to obtain a sensor element for thermal type air flow meters. The length of the short sides W1 of the rectangular first diaphragm section is made substantially equal to the length of the short sides of the second diaphragm section rectangular as well. Thus, the pressures applied to each of the diaphragm sections are substantially identical with each other in pressurization during screening.

11 Claims, 15 Drawing Sheets

THERMAL TYPE AIR FLOW METER HAVING SEMICONDUCTOR SENSOR ELEMENTS WITH SIMILAR DIAPHRAGM SIZES

CLAIM OF PRIORITTY

The present application claims priority from Japanese application serial no. 2004-238565, filed on Aug. 18, 2004, the content of which is hereby incorporated by reference into this application.

FIELD OF THE INVENTION

The present invention relates to a thermal type air flow meter using a sensor element of semiconductor, and more particularly to a thermal type air flow meter suitable for measuring an intake air flow rate of an internal combustion engine.

BACKGROUND OF THE INVENTION

Recently, a fuel feed rate of an automobile engine (internal combustion engine) is generally controlled based on an intake air flow rate. An intake air flow meter is required for this purpose. Of various types of intake air flow meters, thermal type flow meters have come into widespread use because of their capability to directly sense mass air flow rate.

Of various types of thermal type air flow meters, especially, those using a sensor element (measuring element) manufactured by semiconductor micromachining technology are advantageous in terms of the following: cost reduction, low-power driving, and high-speed responsibility. Therefore, thermal type air flow meters using a sensor element based on this semiconductor technology have become part of mainstream through the years.

Air flow meters constructed as described below are known as conventional art: the substrate of their sensor element is provided with a plurality of diaphragms (thin membrane portions). A heating resistor, an upstream thermal sensitive resistor to the heating resistor and a downstream thermal sensitive resistor thereto served as a flow rate sensor are disposed on these diaphragms. The upstream and downstream sensitive resistors are disposed adjacently to the heating resistor. (Refer to Japanese Patent Laid-Open No. 2001-349759, for example.)

In this thermal type air flow meter according to prior art, a plurality of diaphragms are provided in line in the direction orthogonal to the direction of flow of a fluid to be measured. Such a configuration of diaphragms makes it possible to enhance the strength of the diaphragms and ensure sensitivity and responsibility of the sensor.

The thermal type air flow meter has the following problem: a measuring error is caused due to a change in intake air temperature. Thermal type air flow meters constructed as described below to cope with this are also known as conventional art: an intake air temperature sensor is installed at part of the sensor element of a thermal type air flow meter, and the intake air temperature is measured with it to correct an air flow rate measurement. Thus, measuring errors due to a change in intake air temperature are reduced so that the air flow rate can be measured with higher accuracy.

In this case, the intake air temperature sensor must be separately installed. This increases the number of parts of the thermal type air flow meter, and further requires mounting structure and wiring for installing the intake air temperature sensor. This results in increased production cost.

A technology to integrate an intake air temperature sensor with the sensor element of a thermal type air flow meter has solved this problem. Namely with this technology, the number of parts and wiring for electrically connecting the intake air temperature sensor can be reduced.

Furthermore, the intake air temperature sensor can be integrally provided on the sensor element of the thermal type air flow meter by the following means: the sensor element is formed on a semiconductor substrate of single crystal silicon using micromachining technology. In addition, a thermistor, a temperature sensitive resistor, and the like are formed on the sensor element. As a result, the cost can be further reduced.

Description will be given to an example of a thermal type air flow meter according to conventional art in which a sensor element is provided with an intake air temperature sensor. FIG. 20 is a plan view illustrating conventional art; FIG. 21 is a sectional view taken along the line A-A of FIG. 20; and FIG. 22 is a sectional view taken along the line B-B of the same. In these drawings, numeral 1 denotes a sensor element.

Numeral 2 denotes a semiconductor substrate; 3 and 4 denote diaphragm sections; 5 denotes a heating resistor; 6a and 6b denote thermal sensitive resistors; 7 and 8 denote cavity portions; 9 denotes a temperature compensation resistor; 10 denotes an electrical insulating film; 11 denotes a resistor for intake air temperature sensor; and 12a to 12j denote terminal electrode sections.

Arrow f indicates the direction in which a fluid to be measured (intake air) flows relative to the sensor element 1. In these drawings, therefore, the left side is upstream and the right side is downstream.

As illustrated in FIG. 21 and FIG. 22, the cavity portions 7 and 8 are formed at the semiconductor substrate 2 from one side. The electrical insulating film 10 is formed on the other side of the semiconductor substrate so that these cavity portions 7 and 8 are closed therewith. Thus, the diaphragm sections 3 and 4 are formed. The heating resistor 5 and the thermal sensitive resistors 6a and 6b are disposed on the diaphragm section 3. The resistor 11 for intake air temperature sensor is disposed on the diaphragm section 4.

The thermal sensitive resistor 6a is disposed upstream from the heating resistor 5 adjacently thereto. Downstream from the heating resistor 5, the thermal sensitive resistor 6b is similarly disposed adjacently thereto.

In order to measure the air flow rate with this sensor element 1, the heating resistor 5 is energized to electrically heat itself. At this time, the temperature of the heating resistor 5 is controlled so that it is higher by a certain temperature than the temperature of the temperature compensation resistor 9, that is, the temperature of the fluid to be measured. (The temperature of the fluid to be measured≅the temperature of the semiconductor substrate 2.)

In this state, a change in temperature difference is measured between a pair of the thermal sensitive resistors 6a and 6b disposed upstream and downstream from the heating resistor 5. When assuming that air is not flowing now, the distribution of temperature on the diaphragm section 3 is symmetric between the upstream side and the downstream side with respect to the heating resistor 5. As a result, the thermal sensitive resistor 6a and the thermal sensitive resistor 6b become identical with each other in temperature; therefore, no difference is produced in resistance value.

On the other hand, when air flows in the direction of arrow f, the upstream thermal sensitive resistor 6a is exposed to the air flow. Therefore, it is much cooled, and its temperature falls. Meanwhile, the downstream thermal sensitive resistor 6b is exposed to air heated by the heating resistor 5. Therefore, it is not so much cooled, and its temperature does not fall so much.

As a result, a temperature difference corresponding to the air flow rate is produced between the thermal sensitive resistor 6a and the thermal sensitive resistor 6b, and a difference corresponding to the air flow rate is also produced in resistance value. Consequently, this difference in resistance value is sensed to determine the air flow rate.

The sensor element is configured so that the intake air temperature is measured with the resistor 11 for intake air temperature sensor. For this purpose, the resistor 11 is formed of a resistor material having a large temperature coefficient at zeroth order of the resistance. Therefore, the intake air temperature can be determined by variation in the resistance value of the resistor 11.

As illustrated in FIG. 22, the resistor 11 for intake air temperature sensor is placed on the diaphragm section 4 formed by covering the cavity portion 8 with the electrical insulating film 10. Thus, the thermal capacity is reduced, and the responsibility to the change in intake air temperature is enhanced.

The pressure in the intake pipe of an engine can be steeply increased due to the occurrence of back fire or the like. In such a case, a pressure almost two times greater than the atmospheric pressure can be applied to the sensor element of the thermal type air flow meter, and it can be subject to great mechanical stress. The sensor elements are required to be free from breakage for a long time even under such circumstances.

A defective, for example, a sensor element having damage to its diaphragm section, can exist in a manufacturing process. If such a defective is mounted on an engine and the engine is started, the engine prematurely gets out of order. This is because the sensor element does not have durability enough to endure the harsh pressure conditions mentioned above.

Therefore, failure in the diaphragm sections of a thermal type air flow meter is one of significant causes of such a premature failure. For this reason, defectives must be screened out in the process of manufacture, and screening is a common practice for removing defectives. In case of the sensor element of the thermal type air flow meter, screening is carried out by exerting a predetermined stress on the diaphragm by applying pressure to its diaphragm sections from one side.

For example, the following measures are taken in the semiconductor micromachining process: in the stage of wafer prior to dicing, the cavity portions in positions where the diaphragm sections of the sensor element are formed are sealed. The sensor element is placed in high-pressure environmental test equipment. A pressure difference is produced between one side and the other side of each diaphragm section, and stress is applied to the diaphragm sections. In case of a defective having damage, its diaphragm sections are destroyed.

With this method, a large amount of sensor elements can be tested and screened at a time, and efficient screening can be carried out with ease. The method is effective in providing sensor elements free from defect.

The above-mentioned conventional art does not give consideration to problems that may occur when a temperature sensor for measuring the intake air temperature is formed on the sensor element of a thermal type flow meter. It has trouble with provision of sensor elements free from defect.

As described with respect to the above conventional art, a problem arises when a resistor 11 for intake air temperature sensor is formed on a sensor element 1. Two diaphragm sections exist in the sensor element 1: a diaphragm section 3 in which a heating resistor 5 and thermal sensitive resistors 6a and 6b are formed; and a diaphragm section 4 in which the resistor 11 is formed.

Thus, the test pressure must be varied from one diaphragm section to another diaphragm section during screening because the two diaphragm sections are different in size from each other in the conventional art. Since the sensor element is as small as several millimeters, it is substantially impossible to adjust the test pressure from one diaphragm section to another diaphragm section. As a result, satisfactory screening cannot be carried out.

If a test pressure most suitable for either diaphragm section is selected for screening, the other diaphragm section is exposed to excessive pressure, and its life is shortened. Or, the pressure is insufficient for the other diaphragm section, and satisfactory screening cannot be carried out. In either case, provision of sensor elements free from defect cannot be expected.

An object of the present invention is to provide a thermal type air flow meter wherein whether a sensor element is non-defective or defective can be determined with ease and accuracy by screening.

SUMMARY OF THE INVENTION

The above object is attained by taking the following construction. A thermal type air flow meter has a sensor element comprising: a first diaphragm-section and a second diaphragm-section which are comprised of respective cavity-portions and insulating diaphragms being formed at a semiconductor substrate; a thermal sensitive resistor for air-flow rate measurement being disposed on the first diaphragm-section; and an intake air temperature-measurement resistor being disposed on the second diaphragm section. Furthermore, the first diaphragm section and the second diaphragm section are configured so that a stress of the first diaphragm section due to a pressure difference of its both surfaces and that of the second diaphragm section are substantially identical to each other.

The above object is also attained by taking the following construction. Likewise, a thermal type air flow meter has a sensor element comprising: a first diaphragm-section and a second diaphragm-section which are comprised of respective cavity-portions and insulating diaphragms being formed at a semiconductor substrate; a thermal sensitive resistor for air-flow rate measurement being disposed on the first diaphragm-section; and an intake air temperature-measurement resistor being disposed on the second diaphragm section. Furthermore, both planar shapes of the first and second diaphragm sections are respectively rectangles having short sides and long sides; and dimensions of the first and second diaphragm sections are set so that each size of the short sides of the second diaphragm section is 0.9 times to 1.1 times each size of the short sides of the first diaphragm section.

The above object is also attained by taking the following construction. Likewise, a thermal type air flow meter has a sensor element comprising: a first diaphragm-section and a second diaphragm-section which are comprised of respective cavity-portions and insulating diaphragms being formed at a semiconductor substrate; a thermal sensitive resistor for air-flow rate measurement being disposed on the first diaphragm-section; and an intake air temperature-measurement resistor being disposed on the second diaphragm section. Furthermore, a planar shape of the first diaphragm section is a rectangle having short sides and long sides, and a planar shape of the second diaphragm is a polygon. The dimensions of the polygon are set so that each of opposite sides having minimum size of the polygon is 0.9 times to 1.1 times each of the short sides of the rectangle.

The above object is also attained by taking the following construction. Likewise, a thermal type air flow meter has a sensor element comprising: a first diaphragm-section and a second diaphragm-section which are comprised of respective cavity-portions and insulating diaphragms being formed at a semiconductor substrate; a thermal sensitive resistor for air-flow rate measurement being disposed on the first diaphragm-section; and an intake air temperature-measurement resistor being disposed on the second diaphragm section. Furthermore, a planar shape of the first diaphragm section is a rectangle having short sides and long sides, and a planar shape of the second section is a polygon comprising a combination of a plurality of rectangles. The dimensions of the polygon are set so that each of opposite sides having minimum size of the polygon is 0.9 times to 1.1 times each of the short sides of the rectangle.

At this time, the above object is also attained by making the following distances equal to each other: the distance between a periphery of the first diaphragm section and the thermal sensitive resistor of the same is equal to a distance between a periphery of the second diaphragm section and the intake air temperature-measurement resistor of the same.

At this time, the following construction may be adopted: each protective coat being formed of organic material is provided on each surface on the peripheries of the first and second diaphragm sections.

At this time, the following construction may be adopted: the sensor element has a drive unit for driving the sensor element being provided on the semiconductor substrate. Also, the following construction may be adopted: the sensor element has a computing unit for taking in information of an air flow rate and an air temperature from the sensor element, computing based on the information and outputting the result of computation.

At this time, the following construction may be adopted: the computing unit is equipped with an externally writable memory, and the computing unit carries out computation using information stored in this memory. Also, the following construction may be adopted: the computing unit is equipped with a temperature sensor therein or in the proximity to thereof, and the computing unit carries out computation based on temperature information obtained through the temperature sensor.

At this time, the following construction may be adopted: the drive unit and the computing unit are placed on board of the semiconductor substrate of the sensor element. Also, the following construction may be adopted: the semiconductor substrate has a recessed area between the diaphragm sections and a group of the drive unit and the computing unit.

When pressure is applied to a rectangle diaphragm section, maximum stress is exerted on, especially, the peripheral portion of the diaphragm section. In the peripheral portion, the stress is especially increased in the center of the long sides.

This stress is more greatly varied when the length of the short sides of the diaphragm section is changed than when the length of the long sides is changed. This indicates that the maximum stress exerted on a diaphragm section largely depends on the length of its short sides.

Therefore, the following can be implemented by making the lengths of the short sides of the first diaphragm section in rectangular shape and that of the second diaphragm section substantially equal to each other: the maximum stresses exerted on these diaphragm sections can be made identical with each other. A large amount of sensor elements can be screened at a time with optimum pressure on a plurality of the diaphragm sections formed in the sensor elements.

In the above-mentioned example, the diaphragm sections are formed in rectangular shape; however, the present invention is not limited to this constitution. To attain the object, it is important to make identical the maximum stresses exerted on diaphragm sections when the pressure around a sensor element fluctuates. Even in any other shape, the same effect can be produced if there are lengths dependant on the maximum stress and such a construction that these lengths are unified is adopted, as mentioned above.

If the maximum stresses exerted on the diaphragm sections when the pressure around the sensor element fluctuates are identical, it means the following matter. When an ambient pressure is gradually increased to increase the stress on the diaphragm sections, all the diaphragm sections are broken with substantially the same timing. Therefore, the same effect is also produced if such a shape that diaphragm sections are broken under the same ambient pressure is adopted.

According to the present invention, a large amount of sensor elements can be screened at a time under optimum pressure. Thus, a thermal type air flow meter that is excellent in mass productivity, reliability, and measurement accuracy can be provided.

DETAILED DESCRIPTION OF THE PREFERRED EMBODIMENTS

Figure 1:
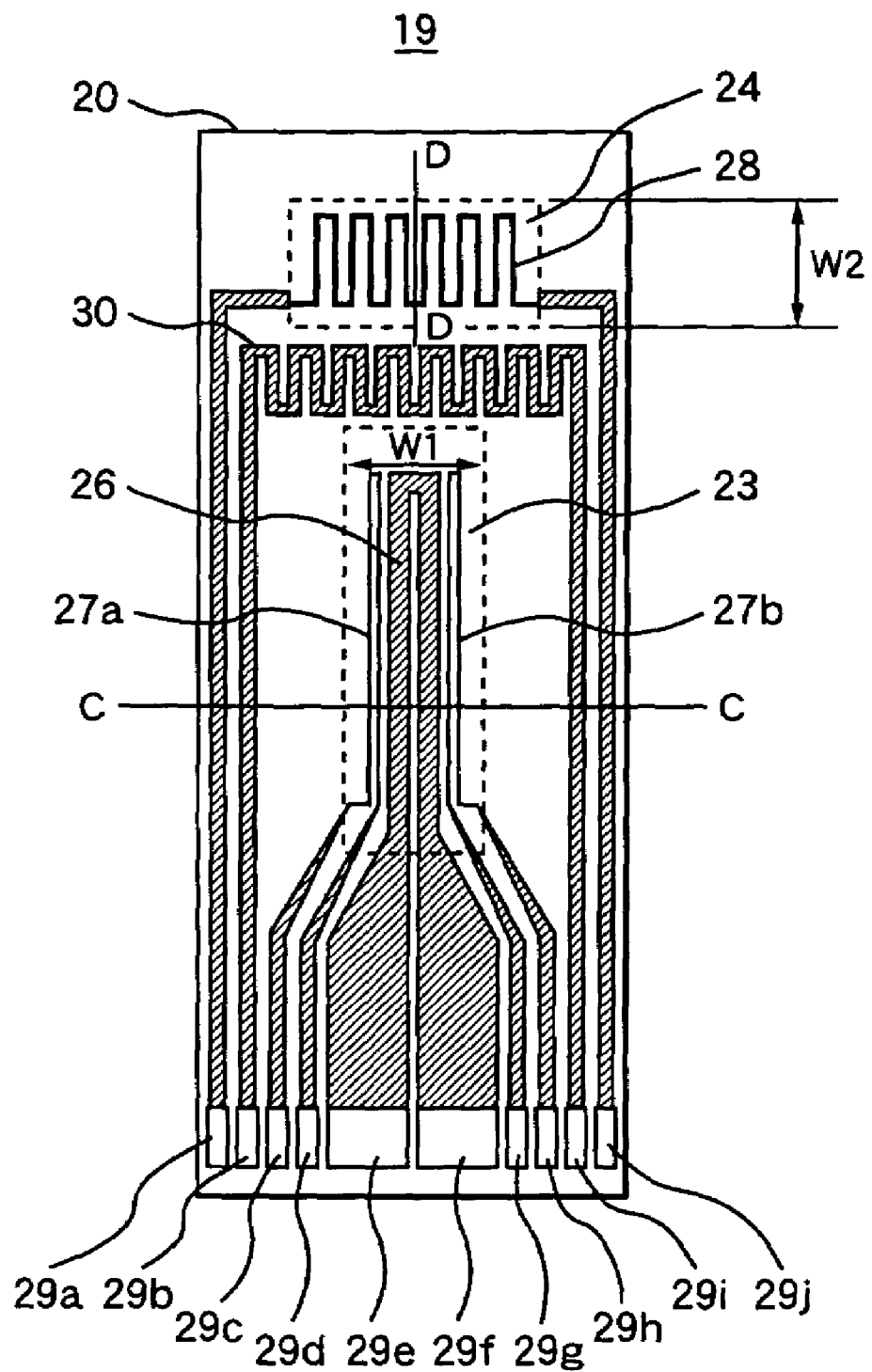
FIG. 1 is a plan view of a sensor element in a first embodiment of a thermal type air flow meter according to the present invention.

Hereafter, more detailed description will be given to thermal type air flow meters according to the present invention based on the embodiments illustrated in the drawings.

Figure 2:
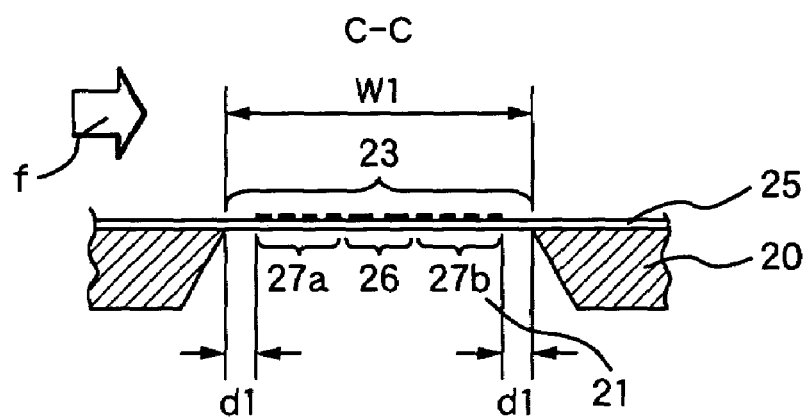
FIG. 2 is a sectional view of the sensor element in the first embodiment, which is taken along the line C-C of FIG. 1.
Figure 3:
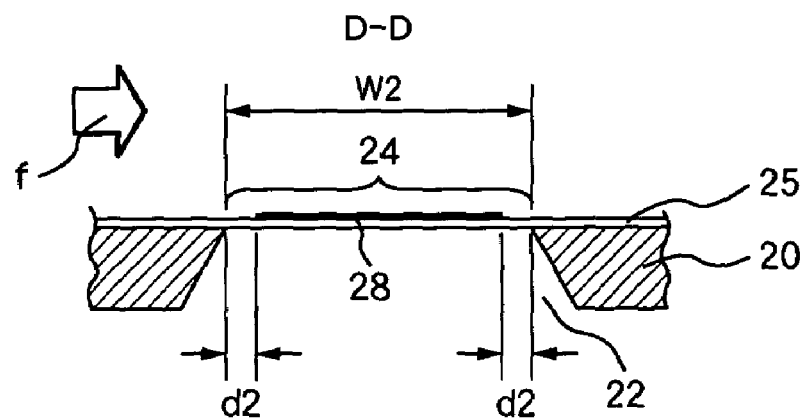
FIG. 3 is a D-D line sectional view of the sensor element in the f embodiment, which is taken along the line D-D of FIG. 1.

FIG. 1 is a plan view of a sensor element in a first embodiment of a thermal type air flow meter according to the present invention. FIG. 2 is a sectional view taken along the line C-C of FIG. 1, and FIG. 3 is a sectional view taken along the line D-D of the same. In FIG. 1, numeral 19 denotes the sensor element of the thermal type air flow meter.

In the example illustrated in these drawings, the whole of the sensor element 19 is formed based on a semiconductor substrate 20 comprising a single crystal silicon (Si) plate. A cavity portion 21 and a cavity portion 22 are formed in this semiconductor substrate 20. Both of the cavity portion 21 and the cavity portion 22 are formed as holes whose planar shape is a rectangle.

In FIGS. 2 and 3, arrow f indicates the direction in which a fluid to be measure (intake air) flows relative to the sensor element 19. In these drawings, therefore, the left side is upstream and the right side is downstream.

A diaphragm section 23 as a first diaphragm is formed on one side of the cavity portion 21, and a diaphragm section 24 as a second diaphragm is formed on one side of the cavity portion 22. The diaphragm section 23 is formed by a part of an electrical insulating film 25 provided on either side (the upper face in FIG. 2) of the semiconductor substrate 20, which covers the cavity portion 21.

The electrical insulating film 25 comprises a thin film of silicon dioxide ($SiO_2$). Therefore, the diaphragm section 23 also comprises the thin film of silicon dioxide ($SiO_2$), and a heating resistor 26 and thermal sensitive resistors 27a and 27b are formed on the surface thereof. One thermal sensitive resistor 27a is disposed upstream from the heating resistor 26 adjacently thereto. Downstream from the heating resistor 26, the other thermal sensitive resistor 27b is similarly disposed adjacently thereto.

The diaphragm section 24 is also formed by a part of the electrical insulating film 25 provided on either side (the upper face in FIG. 3) of the semiconductor substrate 20, which covers the cavity portion 22. A resistor (intake air temperature-measurement resistor) 28 that serves as an intake air temperature sensor for measuring the temperature of the fluid to be measured is formed on the surface of the diaphragm section 24.

The heating resistor 26 is formed of a thin film of polycrystalline or single crystal silicon doped with impurity. Thereby, it has a predetermined resistance value and a predetermined temperature coefficient at zeroth order of the resistance.

The thermal sensitive resistors 27a and 27b are also formed of a thin film of polycrystalline or single crystal silicon doped with impurity. They are thereby so formed that they have a predetermined resistance value and a predetermined temperature coefficient at zeroth order of the resistance.

Further, the resistor 28 that serves as an intake air temperature sensor is also formed of a thin film of polycrystalline or single crystal silicon doped with impurity. Thereby, it has a predetermined resistance value and a predetermined temperature coefficient at zeroth order of the resistance.

In FIG. 1, a temperature compensation resistor 30 is used for compensating the temperature of the heating resistor 26. This temperature compensation resistor 30 is also formed of a thin film of polycrystalline or single crystal silicon doped with impurity. Thereby, it has a predetermined resistance value and a predetermined temperature coefficient at zeroth order of the resistance.

At one end (the lower end in FIG. 1) of the sensor element 19, terminal electrode portions 29a to 29j of these resistors are formed on the surface of the electrical insulating film 25. These terminal electrode portions 29a to 29j comprise thin film pads of aluminum (Al), gold (Au), or the like.

In order to measure the air flow rate with this sensor element 19, the heating resistor 26 is energized to electrically heat itself and increase its temperature. At this time, the temperature of the heating resistor 26 is controlled so that it is higher by a certain temperature than the temperature of the temperature compensation resistor 30, that is, the temperature of the fluid to be measured indicated by arrow f. In this state, variation in temperature difference is measured between a pair of the thermal sensitive resistors 27a and 27b disposed upstream and downstream from the heating resistor 26. The air flow rate is thereby determined.

More specific description will be given. When air as the fluid to be measured is not flowing, the distribution of temperature on the diaphragm section 23 is symmetric between the upstream side and the downstream side with respect to the heating resistor 26. When the temperature distribution is symmetric as mentioned above, the thermal sensitive resistor 27a and the thermal sensitive resistor 27b are brought to the identical temperature; therefore, no temperature difference is produced.

If air flows in the direction of arrow f, the upstream thermal sensitive resistor 27a is directly exposed to the air flow, and thus it is much cooled. Meanwhile, the downstream thermal sensitive resistor 27b is exposed to air heated by the heating resistor 26, and thus it is not so much cooled.

Therefore, the temperature of the thermal sensitive resistor 27a becomes lower than that of the thermal sensitive resistor 27b, and a temperature different is produced in correspondence with the air flow rate.

When the fluid to be measured flows in the direction opposite to that of arrow f, the temperature of the thermal sensitive resistor 27b becomes lower than that of the thermal sensitive resistor 27a. Therefore, the direction of the flow can be determined by comparing the temperature of the thermal sensitive resistor 27a with that of the thermal sensitive resistor 27b.

Figure 4A:
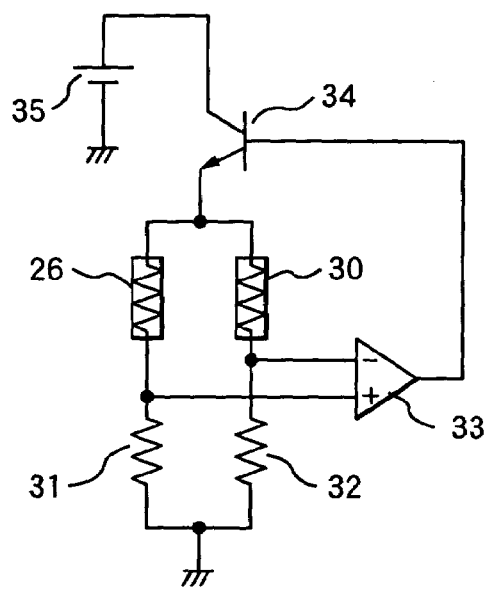
FIGS. 4A, 4B, and 4C are circuit diagrams of the first embodiment.

Description will be given to circuitry for driving the sensor element 19 with reference to FIGS. 4A to 4C. FIG. 4A illustrates a circuit for controlling the temperature of the heating resistor 26. As illustrated in the figure, this circuit comprises resistors with fixed resistance 31 and 32, a differential amplifier 33, a transistor 34, and a power source 35 in addition to the heating resistor 26 and the temperature compensation resistor 30.

A bridge circuit is composed of the heating resistor 26, temperature compensation resistor 30, resistors 31, and resistor 32. The differential voltage of the bridge is sensed with the differential amplifier 33, and the current supplied from the power source 35 to the bridge is feedback controlled. The current supplied from the transistor 32 to the heating resistor 26 is controlled by this feedback control.

At this time, the heating resistor 26 is caused to produce heat by the current supplied from the transistor 34 because it has a predetermined temperature coefficient at zeroth order of the resistance. As a result, its temperature is increased, and its resistance value is varied. Consequently, the bridge circuit is balanced at a predetermined temperature, and Expression (1) below holds. In this expression, suffix R represents the resistance value of each resistor in FIG. 4A.

$$R26/R31 = R30/R32 \quad (1)$$

Expression (1) indicates the following: when the temperature of the temperature compensation resistor 30, that is, the temperature of a fluid to be measured is increased and the value R30 increases, the resistance value R26 of the heating resistor 26 also increases. Therefore, the temperature of the heating resistor 26 is controlled so that it is constantly higher by a certain temperature $\Delta Th$ than the temperature of the fluid to be measured. The temperature $\Delta Th$ at this time can be arbitrarily set by selecting the fixed resistance values of the resistors 31 and 32.

Figure 4B:
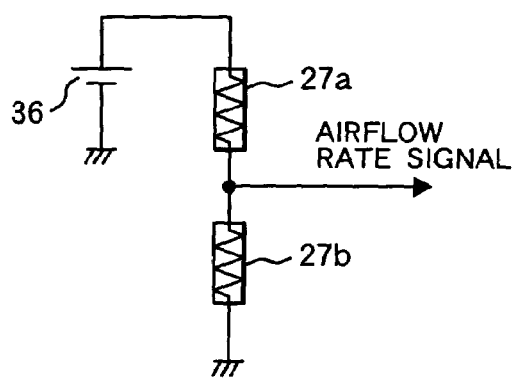

FIG. 4B illustrates a circuit that senses the difference in resistance value due to a difference in temperature between the thermal sensitive resistor 27a and the thermal sensitive resistor 27b, and outputs signals related to the air flow rate. As illustrated in the figure, this circuit comprises the thermal sensitive resistors 27a and 27b and a power source 36. In this circuit, the power source 36 is connected with the series circuit of the thermal sensitive resistor 27a and the thermal sensitive resistor 27b.

The thermal sensitive resistors 27a and 27b are disposed upstream and downstream from the heating resistor 26 in proximity thereto. Therefore, when air flows on the sensor element 19 in the direction indicated by arrow f, the thermal sensitive resistor 27a positioned upstream from the heating resistor 26 is cooled, and its resistance value is lowered.

Meanwhile, the thermal sensitive resistor 27b positioned downstream from the heating resistor 26 is exposed to air heated by the heating resistor 26. Therefore, it is less prone to be cooled, and its resistance value is hardly varied. Therefore, when these thermal sensitive resistors 27a and 27b are connected in series and a difference in resistance value is taken out as a voltage difference, a signal corresponding to the air flow rate is obtained.

Figure 4C:
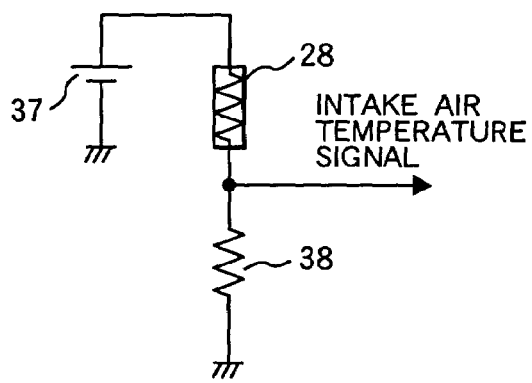

FIG. 4C illustrates a circuit that outputs information about the temperature of a fluid to be measured from variation in the resistance value of the resistor 28. This circuit comprises the resistor 28, a resistor with fixed resistance 38, and a power source 37.

The resistance value of the resistor (intake air temperature-measurement resistor) 28 that serves as an intake air temperature sensor is varied with a change in the temperature of the fluid to be measured. This is because the resistor 28 has a predetermined temperature coefficient at zeroth order of the resistance. Therefore, when the resistor 28 in series with the resistor 38 is connected with the power source 37 and the voltage at the junction point between the resistor 28 and the resistor 38 is taken out, a signal about the temperature of the fluid to be measured can be outputted.

Figure 5:
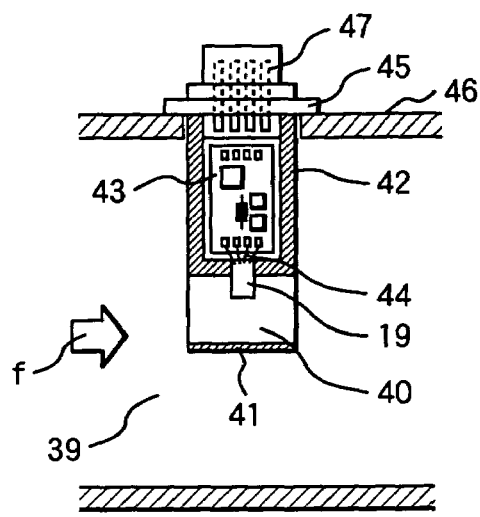
FIG. 5 is an explanatory drawing illustrating the mounting structure of a sensor element in the first embodiment.

With reference to FIG. 5, description will be given to a case wherein this sensor element 19 is installed in the intake pipe to an engine and the intake air flow rate is measured with the thermal type air flow meter. FIG. 5 is a sectional view illustrating the way the sensor element 19 is installed in the intake pipe.

The example illustrated in FIG. 5 is designed so that intake air is let through the main passage 39 of the intake pipe, as indicated by arrow f. The sensor element 19 is installed in the sub-passage 40 protruded into the main passage 39. The member 41 constituting the sub-passage 40 is supported by a casing 42.

The casing 42 is installed on the wall surface 46 of the intake pipe by an attaching support 45. A circuit board 43 is installed in the casing 42, and a drive circuit for driving the sensor element 19 and taking out flow rate signals is mounted on the circuit board 43.

The sensor element 19 is mechanically supported in the casing 42, and is electrically connected with the drive circuit on the circuit board 43 through bonding wires 44 or the like.

An air flow rate signal obtained through measurement with the thermal type air flow meter provided with this sensor element 19 is taken out through a connector 47. The signal is then supplied to an engine control computer (not shown), and used in fuel feed rate control and the like.

Figure 6:
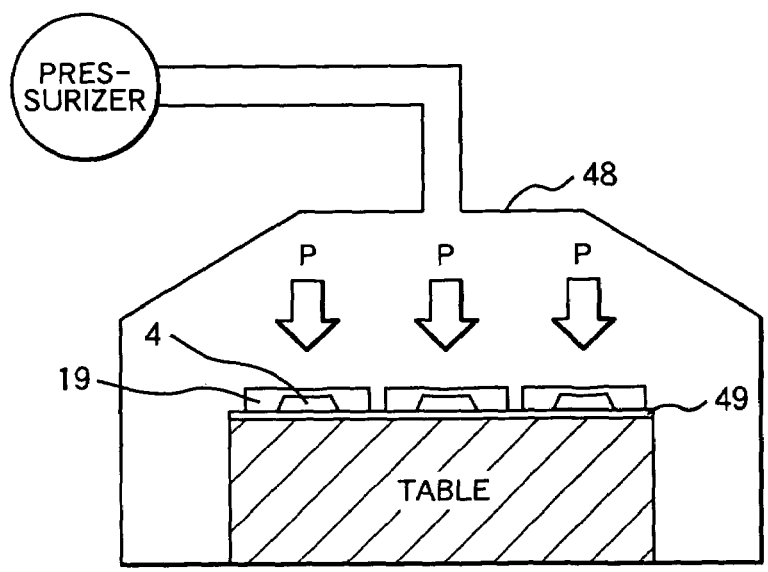
FIG. 6 is an explanatory drawing of equipment for conducting pressure tests on the diaphragm sections of the sensor elements of thermal type air flow meters.

Description will be given to screening that is used in the process of manufacture of the sensor element of such a thermal type air flow meter. In this screening, a test is conducted to determine whether its diaphragm sections have sufficient strength, and defectives are screened. FIG. 6 is a conceptual drawing illustrating this screening. In the example illustrated in this figure, a plurality of sensor elements 19 are placed in pressure test equipment 48, and a large amount of elements can be screened at a time.

First, the back sides of the sensor elements 19 are brought into tight contact with adhesive sheet 49 or the like. Thus, the cavity portions 21 of the diaphragm sections 23 and the cavity portions 22 of the diaphragm sections 24 are sealed out the surrounding environment. As illustrated in the figure, the sensor elements are placed on the table in the pressure test equipment 48.

Next, a pressurizer, such as a pump, is actuated to increase the pressure P in the pressure test equipment 48. Thus, warpage occurs in the diaphragm sections 23 and 24 because the interior of the cavity portions 21 and 22 is sealed off from the outside.

Figure 7:
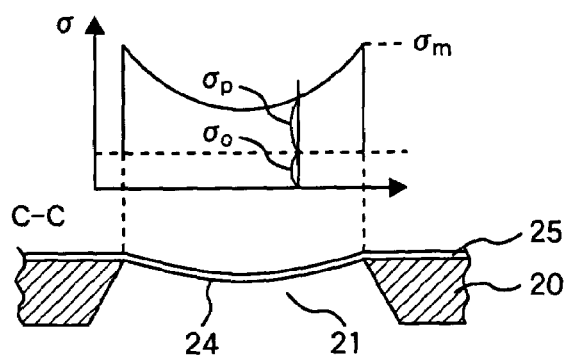
FIG. 7 is an explanatory drawing illustrating the distribution of one-dimensional stress exerted on the diaphragm sections in a sensor element for thermal type air flow meters.

FIG. 7 illustrates the distribution of stress exerted on a diaphragm section due to pressurization during this screening. At this time, stress σ is exerted on the diaphragm section 24. The stress σ is the sum of potential stress $\sigma_0$ and the stress $\sigma_p$ produced due to pressurization ($\sigma=\sigma_0+\sigma_p$). It can be seen that the stress exerted on the diaphragm section at this time becomes the maximum stress $\sigma_m$, especially, at the edges of the diaphragm section.

Figure 8:
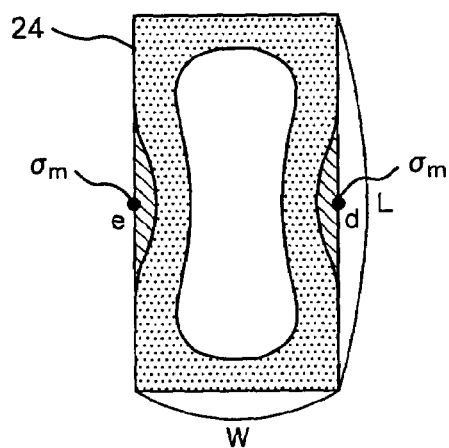
FIG. 8 is an explanatory drawing illustrating the distribution of two-dimensional stress exerted on the diaphragm sections in a sensor element for thermal type air flow meters.

FIG. 8 is a plan view that the distribution of one-dimensional stress exerted on the diaphragm section, illustrated in FIG. 7, is represented by two-dimensionally. The following is apparent from this two-dimensional plan view: the stress exerted on the diaphragm section takes the maximum value $\sigma_m$ at point d and point e in proximity to the center of the long sides L of the rectangular diaphragm section 24. Therefore, it can be seen that the vicinities of point d and point e are areas exposed to large stress and are especially prone to be broken.

Figure 9:
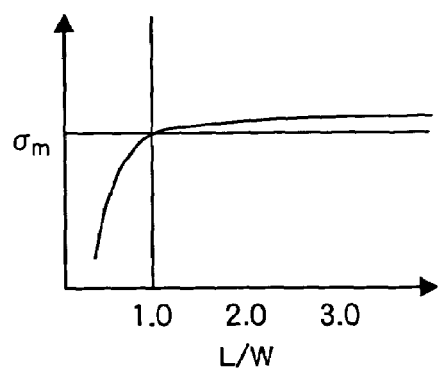
FIG. 9 is an explanatory drawing illustrating the way stress exerted on the diaphragm sections in a sensor element for thermal type air flow meters depends on dimensions.

FIG. 9 illustrates stresses exerted on point d and point e when the size L of the long sides is varied with the size W of the short sides fixed in the rectangular diaphragm section (FIG. 8). The horizontal axis represents the ratio of long side size L to short side size W. Therefore, when the diaphragm section is square-shaped, L/W=1. If L/W>1, the diaphragm section is rectangular, and W represents the size of its short sides and is constant. If L/W<1, L represents the size of its short sides, and the length of the short sides is varied.

The relation of stress will be considered with attention focused on the length of the short sides. It is apparent from FIG. 9 that: when L/W<1 (the length of the short sides is varied), the stress $\sigma_m$ at point d and point e is largely varied; when L/W>1 (the length of the short sides is fixed) with L/W=1 on the border, it is hardly varied.

The present invention pays attention to stress variation relative to L/W. For this reason, the sensor element 19 illustrated in FIG. 1 is configured so that the following is implemented: letting the size of the diaphragm section 23 on which the heating resistor 26 is disposed be W1, the size W2 of the diaphragm section 24 on which the resistor 28 for intake air temperature sensor is made substantially equal to W1 (W1≈W2).

This is equivalent to that the length of the short sides of the diaphragm section 23 and that of the diaphragm section 24 are unified. Thus, the maximum stresses respectively exerted on the diaphragm sections 23 and 24 become identical with each other in pressurization during screening.

Further, the following distances d1 and d2 are made identical with each other: the distance d1 is one between each edge of the electrical insulating film 25 (diaphragm 23) in place where the cavity portion 21 is covered and the resistance pattern on the diaphragm 23, illustrated in FIG. 2; and the distance d2 is one between each edge of the electrical insulating film 25 (diaphragm 24) in place where the cavity portion 22 is covered and the resistance pattern on the diaphragm 23, illustrated in FIG. 3. Thus, the stresses exerted on the electrical insulating film 25 of the individual diaphragm sections 23 and 24 can be made identical with each other.

According to this embodiment, therefore, the pressure need not be adjusted from one diaphragm section to another diaphragm section in pressurization during screening. A plurality of diaphragm sections can be simultaneously checked for defect in one cycle of screening.

The stress exerted on each diaphragm section 23 or 24 is largely varied also according to the thickness of the electrical insulating film 25. Therefore, it is preferable that the thickness of the electrical insulating film 25 and the structure of the resistance patterns should be identical as much as possible.

To make identical the stresses exerted on the diaphragm sections 23 and 24 formed in the sensor element 19, the diaphragm sections can be made completely identical with each other in shape and dimensions. The object can also be sufficiently attained by this method. In this case, however, there is no degree of freedom in the shape of the diaphragm section.

In this embodiment, on the other hand, the lengths of the short sides of rectangles only have to be unified. Therefore, a high degree of freedom can be ensured in the shape of the diaphragm section. Further, a plurality of diaphragm sections can be checked for defect in one cycle of screening, as mentioned above.

In this embodiment, as mentioned above, a plurality of diaphragm sections (the first diaphragm section and the second diaphragm section) are configured so that their shape is rectangular and the lengths of their short sides are substantially identical (W1≈W2). Even if the lengths of the short sides differ from each other to some extent at this time, that is acceptable as long as the difference is within an allowable range. For example, when the difference in the length of short sides is within ±10%, that is, the ratio of the lengths of short sides is between 0.9 times and 1.1 times inclusive, the object can be sufficiently attained.

Figure 10:
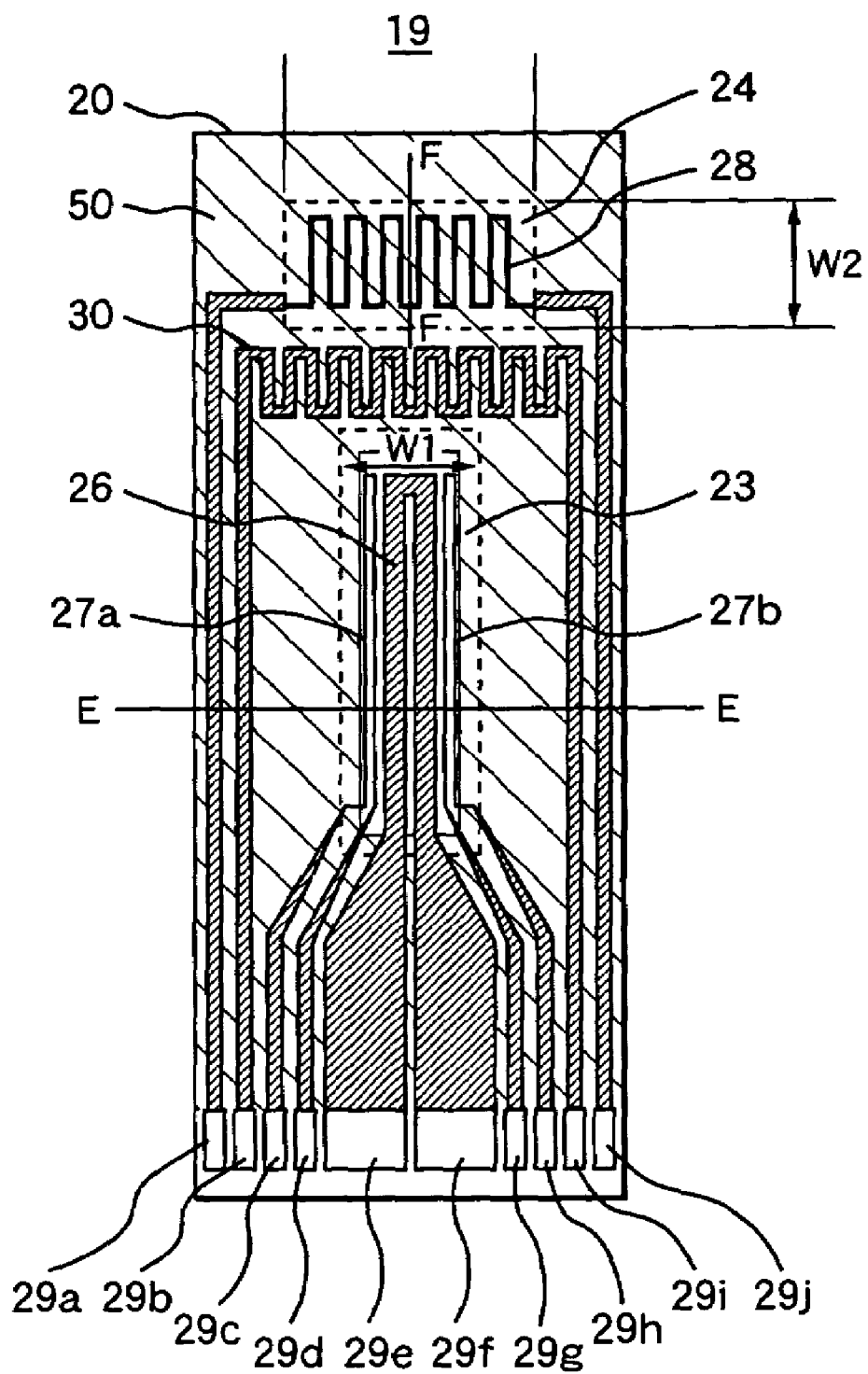
FIG. 10 is a plan view of a sensor element in a second embodiment of a thermal type air flow meter according to the present invention.
Figure 11:
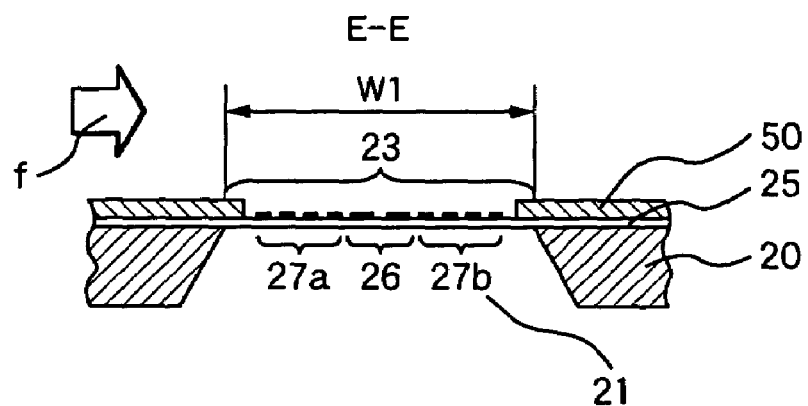
FIG. 11 is a sectional view of the sensor element in the second embodiment, which is taken along the line E-E of FIG. 11.
Figure 12:
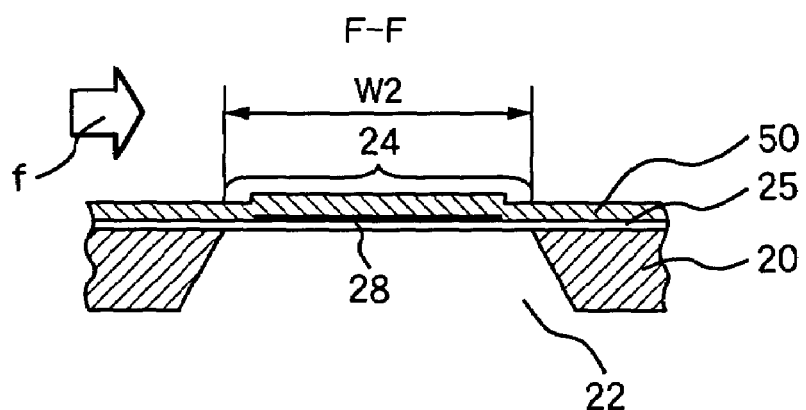
FIG. 12 is a F-F line sectional view of the sensor element in the second embodiment, which is taken along the line F-F of FIG. 11.

FIG. 10 is also a schematic plan view of the sensor element 19 of a thermal type air flow meter, illustrating a second embodiment of the present invention. FIG. 11 is a sectional view taken along the line E-E of FIG. 10, and FIG. 12 is a sectional view taken along the line F-F of the same.

In the drawing of the second embodiment, the same members as described with respect to the first embodiment will be marked with the same numerals, and the description thereof will be omitted. Description will be given only to constructions, features, and the like different from those in the first embodiment.

As is apparent from FIG. 10, FIG. 11, and FIG. 12, the sensor element 19 in the second embodiment is constructed as follows: a protective coat 50 formed of organic material is additionally provided on the surface of the electrical insulating film 25 formed so that the cavity portion 21 and the cavity portion 22 in the semiconductor substrate 20 are covered therewith. The other respects are the same as in the first embodiment.

Particles of sand and the like can be trapped as dust in intake air, and collide with the diaphragm sections 23 and 24. The protective coat 50 functions to absorb the resulting collision energy and prevent the electrical insulating film 25 from being destroyed.

In the second embodiment, therefore, the possibility of the sensor element 19 being damaged can be reduced even if dust is trapped in intake air. Thus, a more reliable thermal type air flow meter can be provided.

At this time, of the surface of the electrical insulating film 25, the surface of the diaphragm section 23 has the heating resistor 26 and the thermal sensitive resistors 27a and 27b formed thereon. Measures must be taken there so as to obtain sufficient thermal conduction from intake air. For this purpose, the protective coat 50 is not provided on the surface of the diaphragm section 23 as illustrated in FIG. 11.

For the organic material for forming the protective coat 50, for example, polyimide is used. With the heat resistance of polyimide taken into account, it is preferable that the continuous use temperature should be controlled to 250° C. or below. Also, in this respect, therefore, the following measures should be taken when the protective coat 50 is formed of polyimide: the protective coat 50 should be formed so that the surface of the heating resistor 26 is not covered therewith, as mentioned above.

As illustrated in FIG. 11, the protective coat 50 is formed so that it slightly extends from the peripheral portion of the cavity portion 21 (diaphragm section 23) to the inside of that at areas where the electrical insulating film 25 forms the diaphragm section 23. The reason for this is as follows: the peripheral portion of the diaphragm section 23 is supported on the semiconductor substrate 20; therefore, the peripheral portion is inferior in capability to absorb the collision energy of particles, and is prone to be destroyed. The peripheral portion of the diaphragm section 23 where the electrical insulating film 25 is especially prone to be destroyed is protected with the protective coat 50.

As illustrated in FIG. 12, in the area on the surface of the electrical insulating film 25 where the resistor 28 for intake air temperature sensor is formed, that is, on the surface of the diaphragm section 24, the protective coat 50 is formed as follows: it is formed so that the entire surface of the diaphragm section including the resistor 28 is covered therewith. The reason for this is as follows: the resistor 28 for intake air temperature sensor produces almost no heat, and it is unnecessary to take into account the thermal insulation for the diaphragm section or the heat resistance of the organic material constituting the protective coat 50.

Even if the protective coat 50 is formed in there, as mentioned above, the stresses exerted on the diaphragm sections can be made identical with each other by taking the following measures: the lengths W1 and W2 of the short sides of the two rectangular diaphragm sections 23 and 24 are made substantially equal. Therefore, a plurality of diaphragm sections can be checked for defect in one cycle of screening.

In the above-mentioned embodiments, diaphragm sections are configured so that their shape is rectangular, and the lengths of their short sides are substantially identical. The object can be similarly attained by any other shape. Also, these cases, there are representative dimensions with which stress exerted on the electrical insulating film is most variable in some diaphragm section shape, like the short sides of a rectangle. Consequently, hereafter, description will be given to embodiments in other shapes.

Figure 13:
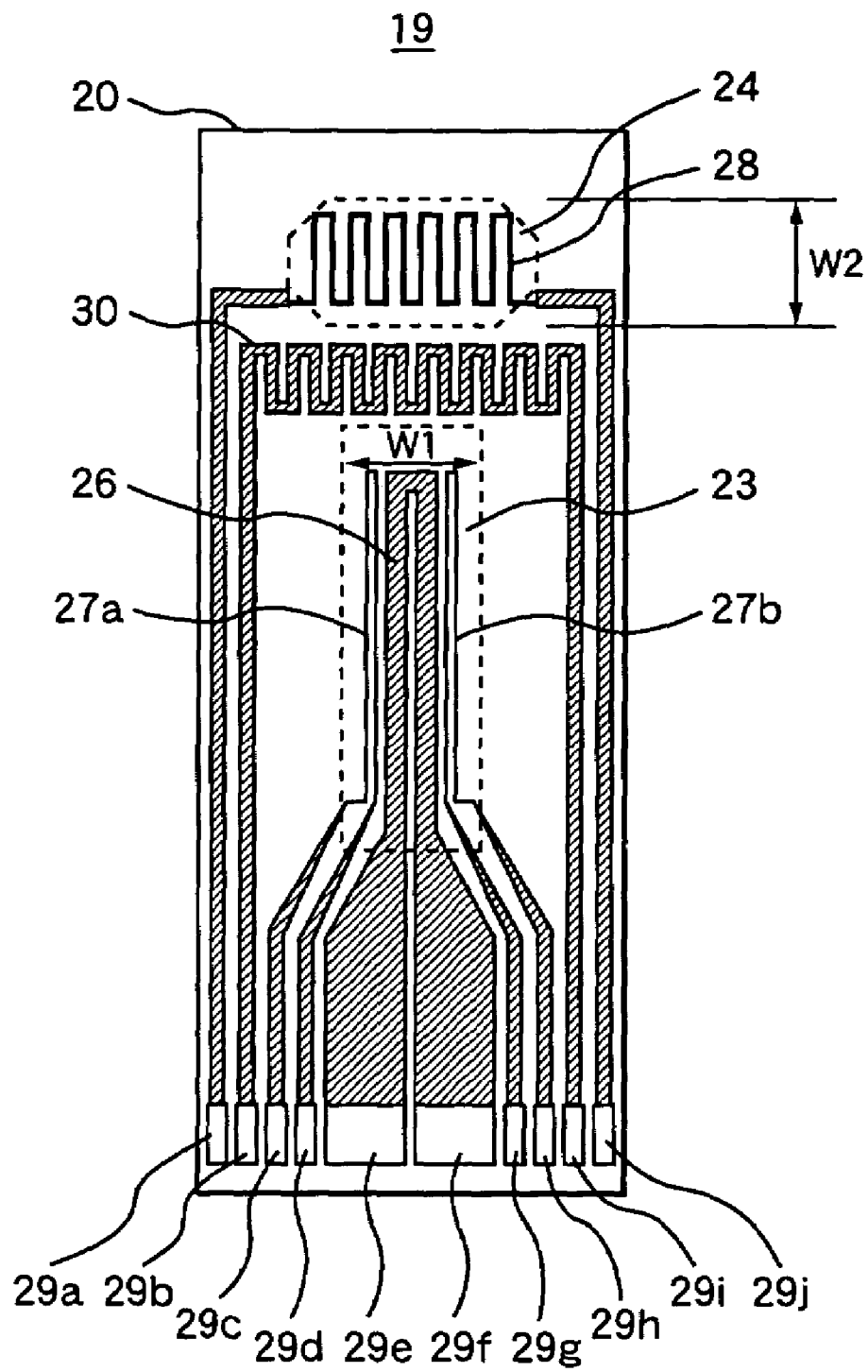
FIG. 13 is a plan view of a sensor element in a third embodiment of a thermal type air flow meter according to the present invention.

Description will be given to a third embodiment with reference to FIG. 13. FIG. 13 is also a schematic plan view of the sensor element of a thermal type air flow meter. Also, in this drawing, the same members as described with respect to the first embodiment will be marked with the same numerals, and the description thereof will be omitted. Description will be given only to constructions, features, and the like different from those in the first embodiment.

In the sensor element 19 in the third embodiment illustrated in FIG. 13, the shape of the diaphragm section 24 on which the resistor 28 for intake air temperature sensor is disposed is polygonal. The other respects are the same as in the first embodiment described with reference to FIG. 1 to FIG. 3.

Also, when the diaphragm section 24 is polygonal as in the third embodiment, the maximum stress exerted on the diaphragm sections of the electrical insulating film is varied according to the size W2 in which the distance between the two opposite sides is minimized.

Consequently, the stresses exerted on the diaphragm sections 23 and 24 can be made substantially identical with each other by taking the following measures: the size W2 in which the distance between the two opposite sides is minimized is made substantially equal to the size W1 of the short sides of the rectangular diaphragm section 23.

Also, according to the third embodiment, therefore, a plurality of diaphragm sections 23 and 24 can be simultaneously checked for defect in one cycle of screening. In this case, further, the mechanical strength of the diaphragm section 24 can be enhanced by making the diaphragm section 24 polygonal.

Also, in the third embodiment, the protective coat 50 formed of organic material may be formed on the surface of the electrical insulating film 25 as in the second embodiment. With this construction, the collision energy of particles that collide with the diaphragm sections 23 and 24 can be absorbed by the protective coat to prevent the electrical insulating film 25 from being destroyed. As a result, the enhancement of reliability can be accomplished.

Figure 14:
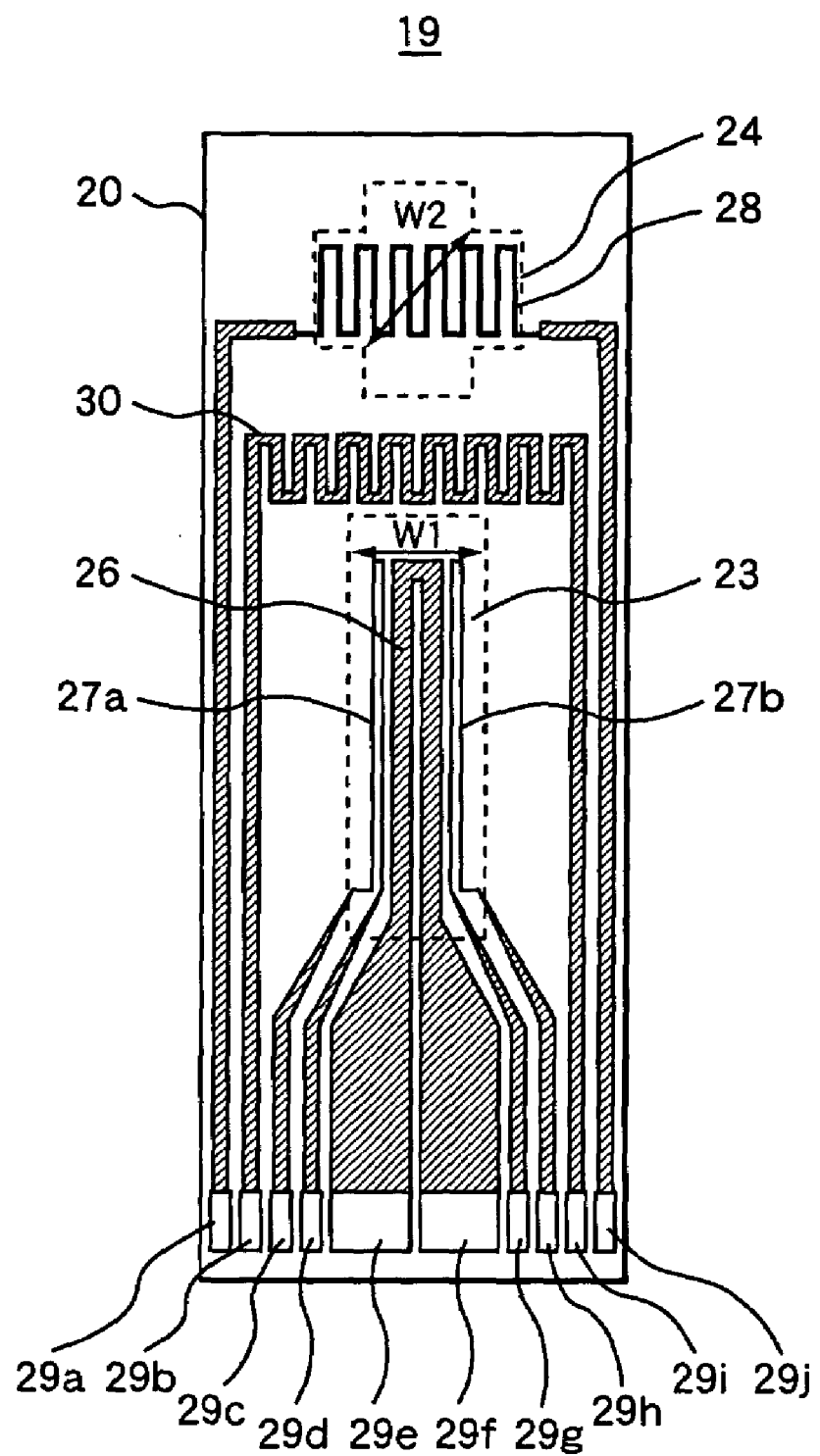
FIG. 14 is a plan view of a sensor element in a fourth embodiment of a thermal type air flow meter according to the present invention.

Description will be given to a fourth embodiment with reference to FIG. 14. FIG. 14 is also a schematic plan view of the sensor element of a thermal type air flow meter. Also, in this drawing, the same members as described with respect to the first embodiment will be marked with the same numerals, and the description thereof will be omitted. Description will be given only to constructions, features, and the like different from those in the first embodiment.

In the sensor element 19 in the fourth embodiment illustrated in FIG. 14, the shape of the diaphragm section 24 on which the resistor 28 for intake air temperature sensor is disposed is a cross polygon comprising a combination of a plurality of rectangles. The other respects are the same as in the first embodiment described with reference to FIG. 1 to FIG. 3.

Also, when the diaphragm section 24 is cross-polygonal as in the fourth embodiment, the maximum stress exerted on the electrical insulating film is varied according to the size W2 in which the distance between the two opposite vertexes is minimized, as illustrated in the figure.

Consequently, the stresses exerted on the diaphragm sections 23 and 24 can be made substantially identical with each other by taking the following measures: the size W2 in which the distance between the two opposite vertexes is minimized is made substantially equal to the size W1 of the short sides of the rectangular diaphragm section 23.

Also, according to the fourth embodiment, therefore, a plurality of diaphragm sections 23 and 24 can be simultaneously checked for defect in one cycle of screening. Also, in this case, further, the mechanical strength of the diaphragm section 24 can be enhanced by making the diaphragm section 24 cross-polygonal.

Also, in the fourth embodiment, the protective coat 50 formed of organic material may be formed on the surface of the electrical insulating film 25 as in the second embodiment. With this configuration, the collision energy of particles that collide with the diaphragm sections 23 and 24 can be absorbed by the protective coat to prevent the electrical insulating film 25 from being destroyed. As a result, the enhancement of reliability can be accomplished.

Figure 15:
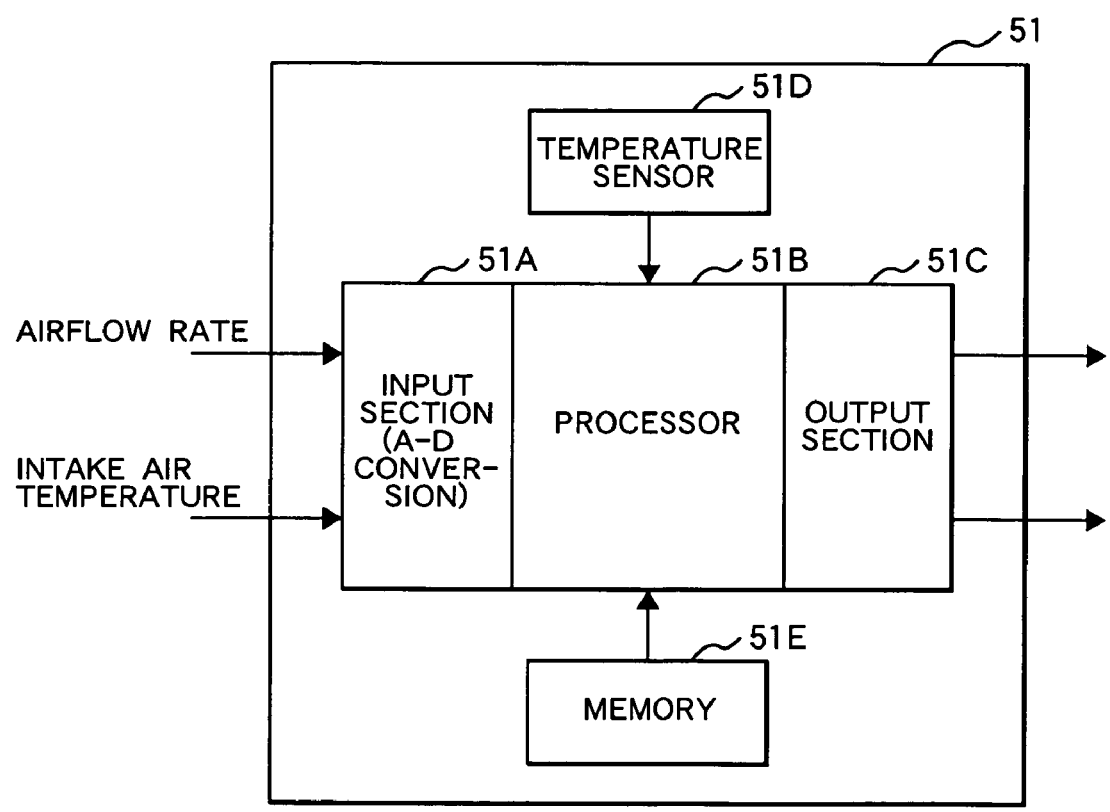
FIG. 15 is a block diagram illustrating an embodiment of the computing unit for temperature correction of a thermal type air flow meter according to the present invention.

FIG. 15 illustrates a computing unit 51 as an embodiment for enhancing the measurement accuracy in a thermal type air flow meter using any of the first to fourth sensor elements 19. This computing unit 51 comprises: an input portion 51A for inputting air flow rate signals and intake air temperature signals from the circuits illustrated in FIG. 4B and FIG. 4C; an arithmetic portion 51B that computes air flow rates and intake air temperatures from these signals with accuracy; an output portion 51C that outputs the result of computation; a temperature sensor 51D that measures the temperatures inside and in proximity to the computing unit 51; and memory 51E in which constants and the like required for computation are stored, and data can be externally written.

Figure 16:
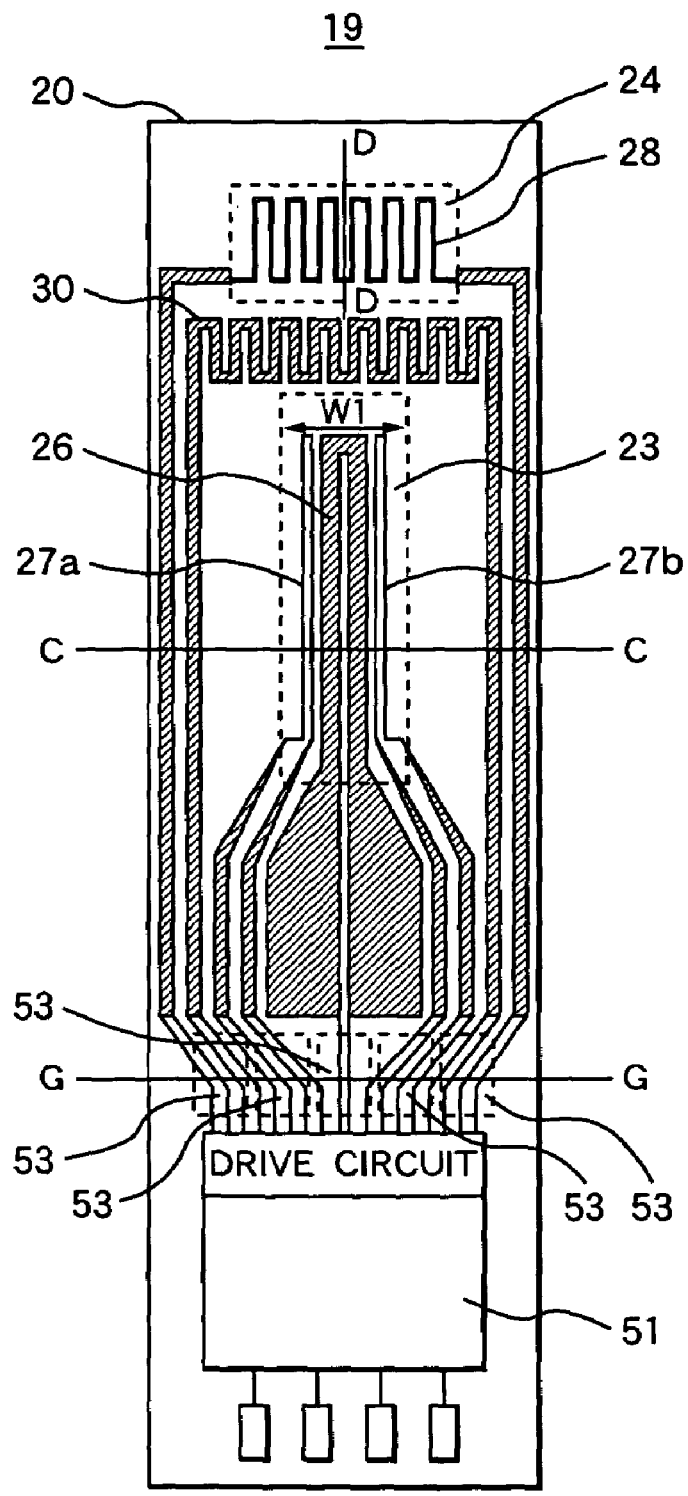
FIG. 16 is a plan view of a sensor element in a fifth embodiment of a thermal type air flow meter according to the present invention.

The computing unit 51 is installed in the thermal type air flow meter, for example, on the circuit board 43 of the thermal type air flow meter illustrated in FIG. 5. At this time, one-chip structure may be adopted. In this case, as illustrated in FIG. 16, the sensor element 19 and the computing unit 51 are formed on the same semiconductor substrate, or the semiconductor substrate 20 of the sensor element 19, through semiconductor process technologies. Further, the drive circuit illustrated in FIG. 4A may also be formed on the same semiconductor substrate.

Figure 17:
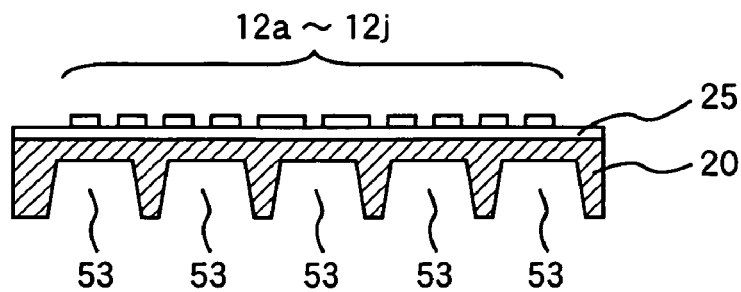
FIG. 17 is a sectional view of the sensor element in the fifth embodiment.

FIG. 17 is a sectional view taken along the line G-G of FIG. 16. As illustrated in FIG. 16 as well, numeral 53 denotes a recess (hollow) formed on the other side (the lower face in FIG. 16) of the semiconductor substrate 20. The recesses are disposed side by side between the sensor element 19 and the computing unit 51 on the semiconductor substrate 20. These recesses function to reduce the sectional area of the semiconductor substrate 20 and suppress thermal conduction. Therefore, this makes it possible to minimize heat transmitted from the computing unit 51 to the sensor element 19.

By adopting a construction including such a computing unit 51, the following parts can be formed on the same semiconductor substrate: resistors for measuring air flow rate and air temperature, a drive circuit for driving these resistors, a circuit that carries out computation for correction, and the like. As a result, a sensor element excellent in mass productivity and measurement accuracy is obtained.

Figure 18:
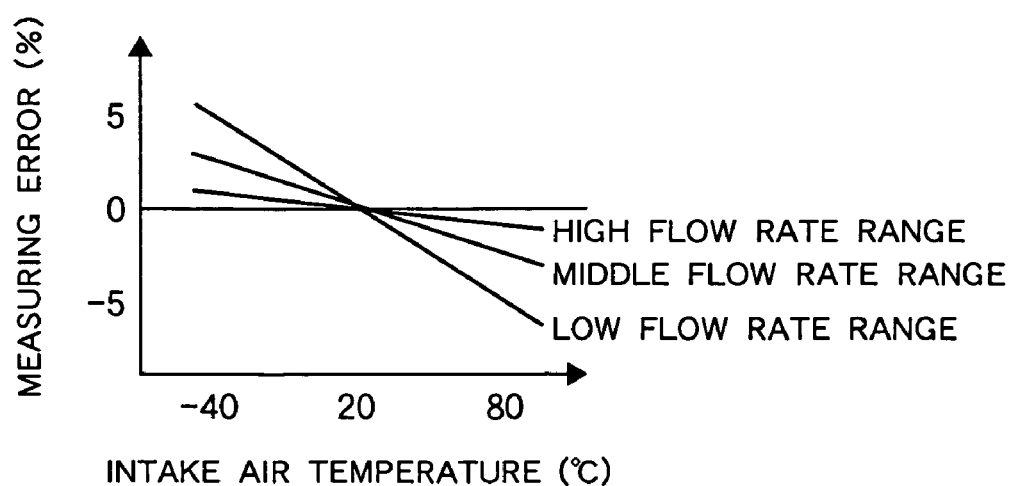
FIG. 18 is a characteristic diagram illustrating an example of the flow rate measuring error characteristic of a thermal type air flow meter in relation to a change in intake air temperature.

When such a thermal type air flow meter is applied to engine control in automobile, it is exposed to harsh conditions under which the temperature of intake air as a fluid to be measured changes over a wide range from −30° C. to 80° C. or so. Even under such harsh conditions, measurement accuracy must be ensured. FIG. 18 illustrates measuring errors produced in the thermal type air flow meter when the intake air temperature changes. The horizontal axis represents intake air temperatures, and the vertical axis represents the measuring error at each temperature relative to an intake air temperature of 20° C.

As apparent from the figure, the measuring error produced when the intake air temperature changes depends on the air flow rate, and it is increased especially in the low flow rate range. Therefore, the measuring error depends both on the intake air temperature and on the flow rate. At this time, the computing unit 51 corrects measuring errors produced according to the flow rate of the fluid to be measured and its temperature, and outputs highly accurate values.

Measuring errors that occur when the intake air temperature changes can be measured in advance. Consequently, air flow rate signals can be corrected and computed according to conditions by taking the following measures: the relation between air flow rate signals measured in advance and measuring errors due to intake air temperature signals is stored in the memory in the computing unit 51.

At this time, a problem arises in the case where the sensor element 19 and the computing unit 51 are formed on the same semiconductor substrate 20 as described with respect to the embodiment illustrated in FIG. 16. Heat generated by the computing unit 51 is transmitted to the resistor 28 for intake air temperature sensor, and the measurement of intake air temperature is thereby influenced. To improve this, in the embodiment illustrated in FIG. 15, the temperature sensor 51D is installed inside or in proximity to the computing unit 51. Thus, to what extent the computing unit 59 generates heat can be measured, and correction can be carried out.

In this case, therefore, the following advantage is brought: even if heat is transmitted to the resistor 28 for intake air temperature sensor and an error is produced, it can be corrected at the arithmetic portion 51B based on information from the temperature sensor 51D. Therefore, intake air temperature signals can be constantly outputted with accuracy.

When the embodiment provided with the recesses 53 described with reference to FIG. 16 and FIG. 17 is adopted, heat transmitted from the computing unit 51 to the sensor element 19 can be minimized. Therefore, it is advantageous.

The relation between intake air temperature and measuring error with air flow rate taken as a parameter, illustrated in FIG. 18, is a characteristic in steady state in which the flow rate and the temperature are stable. Therefore, if the intake air temperature suddenly changes, a transient state thereafter lasts for a while.

In this case, a problem can arise in correction at the computing unit 51. This is especially conspicuous when there is variation in thermal capacity in a flow rate measuring section where the resistor 28 for intake air temperature sensor, the heating resistor 26, and the like are formed.

Figure 19A:
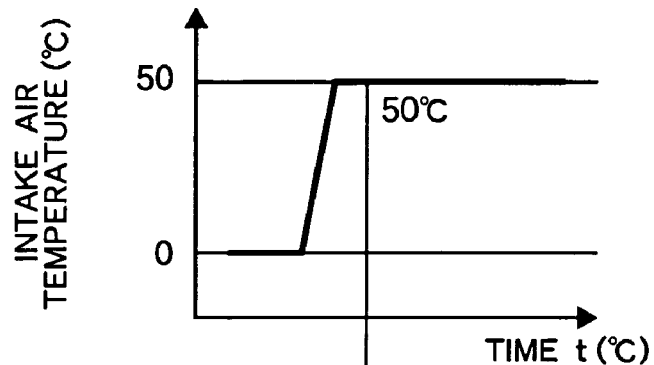
FIGS. 19A, 19B, and 19C are characteristic diagrams explaining transient temperature change in the sensor element of a thermal type air flow meter.
Figure 19B:
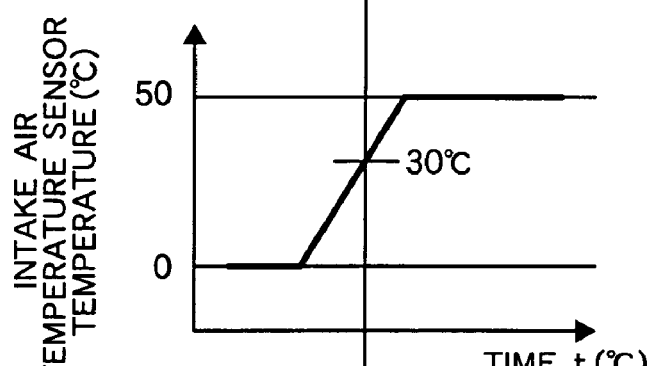
Figure 19C:
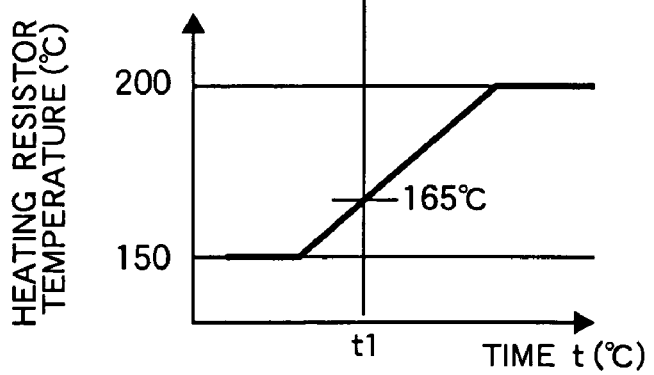
Figure 20:
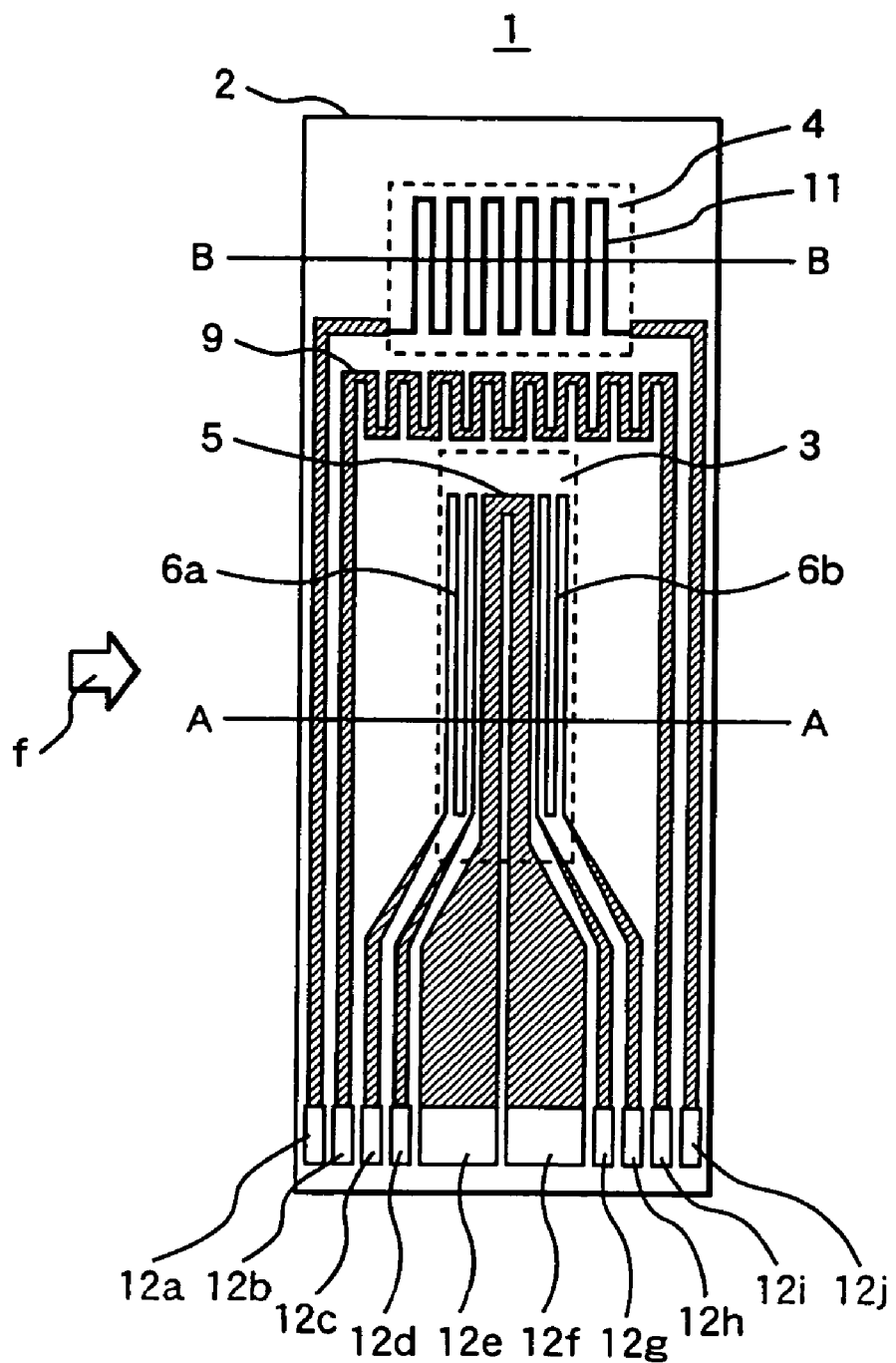
FIG. 20 is a plan view illustrating an example of the sensor element of a thermal type air flow meter according to conventional art.
Figure 21:
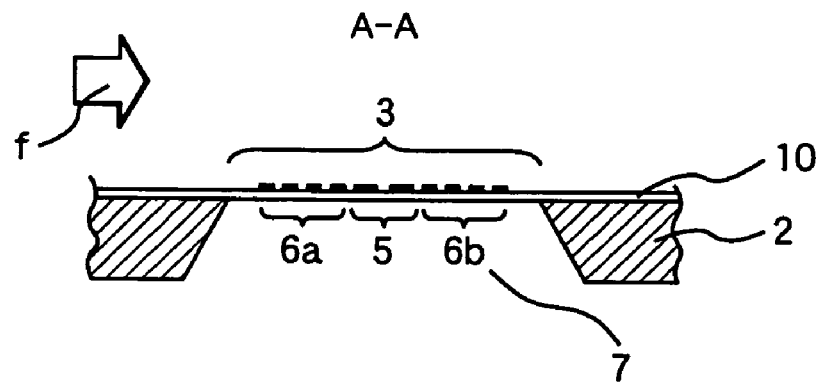
FIG. 21 is a sectional view illustrating an example of the sensor element of the thermal type air flow meter according to conventional art, which is taken along the line A-A of FIG. 20.
Figure 22:
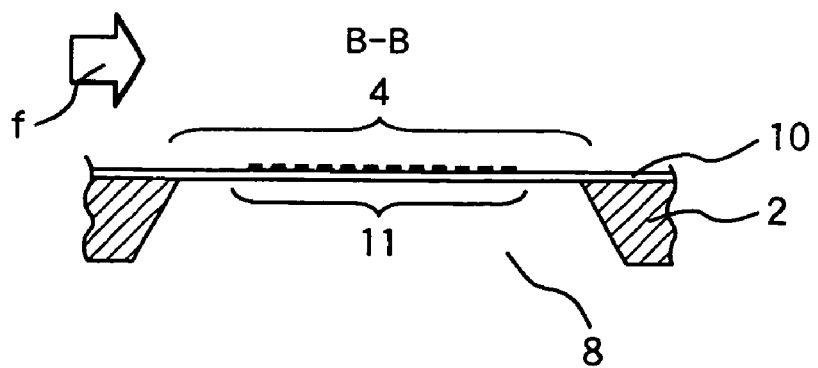
FIG. 22 is a sectional view illustrating an example of the sensor element of the thermal type air flow meter according to conventional art, which is taken along the line B-B of FIG. 20.

FIGS. 19A to 19C illustrate the states of temperature change observed when the intake air temperature suddenly changes with respect to the above embodiment. This sudden intake air temperature change takes place in a sensor element in which the resistor 28 for intake air temperature sensor and the flow rate measuring section are different in thermal capacity. FIG. 19A indicates the intake air temperature; FIG. 19B indicates the temperature of the resistor 28; and FIG. 19C indicates the temperature of the heating resistor 26.

As already described, the temperature of the heating resistor 26 is controlled so that it is higher by a certain temperature than the intake air temperature. In this case, as illustrated in FIG. 19C, its controlled so that it Is higher by 150° C. than the intake air temperature.

Thus, when a certain time t1 has passed after the intake air temperature changes from 0° C. to 50° C., the various temperatures are as illustrated in the figures: the intake air temperature is 50° C.; the intake air temperature sensor temperature is 30° C.; and the temperature of the heating resistor is 165° C. This state of temperature does not exist in the relation between the air flow rate and the measuring error due to intake air temperature, illustrated in FIG. 18. In this case, therefore, there is the possibility that the computing unit 51 cannot properly carry out correction or computation.

To prevent such a problem from arising, the above embodiment is configured so that the resistor 28 for intake air temperature sensor is of diaphragm section structure, similarly with the potion where the heating resistor 26 is formed. By adopting the diaphragm section structure, the thermal capacity is minimized to quickly respond to and follow change in intake air temperature.

What is claimed is:

1. A thermal type air flow meter comprising:
a first diaphragm-section and a second diaphragm-section which are comprised of respective cavity-portions and insulating diaphragms being formed at a semiconductor substrate;
a thermal sensitive resistor for air-flow rate measurement being disposed on the first diaphragm-section; and
an intake air temperature-measurement resistor being disposed on the second diaphragm section,
wherein both planar shapes of the first diaphragm section and the second diaphragm section are respectively rectangles having short sides and long sides, wherein, the first diaphragm section and the second diaphragm section vary in size, and the thermal sensitive resistor for air-flow rate measurement on the first diaphragm and the intake air temperature-measurement resistor on the second diaphragm section have mutually different resistance patterns in shape and size, dimensions of the first and second diaphragm sections are set so that each size of the short sides of the second diaphragm section is 0.9 times to 1.1 times each length of the short sides of the first diaphragm section, and a distance from an edge of the first diaphragm section to the resistance pattern on the first diaphragm section in a short side direction of the first diaphragm section is substantially equal to a distance from an edge of the second diaphragm section to the resistance pattern on the second diaphragm section in a short side direction of the second diaphragm section.

2. The thermal type air flow meter according to claim 1, wherein a distance between a periphery of the first diaphragm section and the thermal sensitive resistor of the same is equal to a distance between a periphery of the second diaphragm section and the intake air temperature-measurement resistor of the same.

3. The thermal type air flow meter according to claim 1, wherein a protective coat being formed of organic material is provided on each surface on the peripheries of the first and second diaphragm sections.

4. The thermal type air flow meter according to claim 1, wherein the sensor element has a drive unit for driving the sensor element being provided on the semiconductor substrate.

5. The thermal type air flow meter according to claim 1, comprising:
a computing unit for taking in information of an air flow rate and an air temperature from the sensor element, computing based on the information and outputting the result of computation.

6. The thermal type air flow meter according to claim 5, wherein the computing unit is equipped with an externally writable memory, and the computing unit carries out computation using information stored in this memory.

7. The thermal type air flow meter according to claim 5, wherein the computing unit is equipped with a temperature sensor therein or in the proximity to thereof, and the computing unit carries out computation based on temperature information obtained through the temperature sensor.

8. The thermal type air flow meter according to claim 5, wherein the sensor element has a drive unit for driving the sensor element being provided on the semiconductor substrate, and
wherein the drive unit and the computing unit are placed on board of the semiconductor substrate of the sensor element.

9. The thermal type air flow meter according to claim 8, wherein the semiconductor substrate has a recessed area between the diaphragm sections and a group of the drive unit and the computing unit.

10. A thermal type air flow meter comprising:
a first diaphragm-section and a second diaphragm-section which are comprised of respective cavity-portions and insulating diaphragms being formed at a semiconductor substrate;

a thermal sensitive resistor for air-flow rate measurement being disposed on the first diaphragm-section; and an intake air temperature-measurement resistor being disposed on the second diaphragm section, wherein a planar shape of the first diaphragm section is a rectangle having short sides and long sides, and a planar shape of the second diaphragm is a polygon, wherein, on conditions that the first diaphragm section and the second diaphragm section vary in size, and the thermal sensitive resistor for air-flow rate measurement on the first diaphragm and the intake air temperature-measurement resistor on the second diaphragm section have mutually different resistance patterns in share and size, dimensions of the polygon are set so that each of opposite sides having minimum length of the polygon is 0.9 times to 1.1 times each of the short sides of the rectangle, and a distance from an edge of the first diaphragm section to the resistance pattern on the first diaphragm section is substantially equal to a distance from an edge of the second diaphragm in a direction of minimum length between opposite sides to the resistance pattern on the second diaphragm.

11. A thermal type air flow meter comprising:
a first diaphragm-section and a second diaphragm-section which are comprised of respective cavity-portions and insulating diaphragms being formed at a semiconductor substrate;

a thermal sensitive resistor for air-flow rate measurement being disposed on the first diaphragm-section; and an intake air temperature-measurement resistor being disposed on the second diaphragm section, wherein a planar shape of the first diaphragm section is a rectangle having short sides and long sides, and a planar shape of the second section is a polygon comprising a combination of a plurality of rectangles, wherein, on conditions that the first diaphragm section and the second diaphragm section vary in size, and the thermal sensitive resistor for air-flow rate measurement on the first diaphragm and the intake air temperature-measurement resistor on the second diaphragm section have mutually different resistance patterns in shape and size, dimensions of the polygon are set so that each of opposite sides having minimum of the polygon of the second diaphragm section is 0.9 times to 1.1 times each of the short sides of the rectangle of the first diaphragm section, and a distance from an edge of the first diaphragm section to the resistance pattern on the first diaphragm section in a short side direction of the first diaphragm section is substantially equal to a distance from an edge of the second diaphragm in a direction of minimum length between opposite sides to the resistance pattern on the second diaphragm.

* * * * *